(12) United States Patent
Billings

(10) Patent No.: US 12,097,586 B2
(45) Date of Patent: *Sep. 24, 2024

(54) APPARATUS, METHOD AND SYSTEM TO TEMPORARILY HOLD A WORKPIECE DURING MANUFACTURING USING ADHESIVE ATTACHMENT

(71) Applicant: Blue Photon Technology & Workholding Systems LLC, Shelby, MI (US)

(72) Inventor: Danial Billings, Rothbury, MI (US)

(73) Assignee: Blue Photon Technology & Workholding Systems LLC, Shelby, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/503,708

(22) Filed: Nov. 7, 2023

(65) Prior Publication Data

US 2024/0066648 A1 Feb. 29, 2024

Related U.S. Application Data

(63) Continuation of application No. 17/720,732, filed on Apr. 14, 2022, now Pat. No. 11,839,942.

(Continued)

(51) Int. Cl.
*B23Q 3/08* (2006.01)
*B23Q 3/06* (2006.01)
(Continued)

(52) U.S. Cl.
CPC ............ *B23Q 3/084* (2013.01); *B23Q 3/063* (2013.01); *B29C 65/4845* (2013.01);
(Continued)

(58) Field of Classification Search
None
See application file for complete search history.

(56) References Cited

U.S. PATENT DOCUMENTS 5,217,654 A 6/1993 Buckley
6,491,281 B1 12/2002 Gotou
(Continued)

FOREIGN PATENT DOCUMENTS

CN 201505629 U 6/2010
DE 102007011729 A1 9/2008
(Continued)

OTHER PUBLICATIONS

Yao et al., Word holding assessment of an UV adhesive and fixture design method, The International Journal of Advanced Manufacturing Technology (2020) 106, pp. 741-752, published Nov. 27, 2019.

*Primary Examiner* — Jacob T Minskey
*Assistant Examiner* — Caroline Beha
(74) *Attorney, Agent, or Firm* — DINSMORE & SHOHL LLP

(57) ABSTRACT

A method and system temporarily holds a workpiece, most suitably an aero engine turbine blade element during manufacture. The workholding system includes a support body with a contoured body surface, complementary to a workpiece surface, formed of a transparent material to define a bonding zone. The support body is supported by a base to form a workpiece shuttle, and a bond station receives the workpiece shuttle. Complementary zero-point locating elements on the shuttle and station assure accurate positioning. The bond station further has workpiece locating elements configured to accurately position the workpiece on the shuttle in a predetermined position relative to the zero-point locating elements of the shuttle, thereby compensating for shuttle-to-shuttle variance. An adhesive, such as a UV (Continued)

curable adhesive, is applied to the bonding zone and cured by UV through the transparent material, thereby fixing the workpiece in the predetermined position.

11 Claims, 25 Drawing Sheets

Related U.S. Application Data

(60) Provisional application No. 63/175,633, filed on Apr. 16, 2021.

(51) Int. Cl.
    *B29C 65/48*         (2006.01)
    *B29C 65/54*         (2006.01)
    *B29L 31/08*         (2006.01)
    *B29K 105/00*       (2006.01)

(52) U.S. Cl.
    CPC ...... *B29C 65/54* (2013.01); *B29K 2105/0097* (2013.01); *B29K 2995/0026* (2013.01); *B29L 2031/082* (2013.01)

(56) References Cited

U.S. PATENT DOCUMENTS

| | | |
|---|---|---|
| 7,172,676 B2 | 2/2007 | DeMeter |
| 8,057,630 B2 | 11/2011 | Hermann et al. |
| 8,341,841 B2 | 1/2013 | Fessler-Knobel |
| 8,685,292 B2 | 4/2014 | Mandler et al. |
| 8,821,672 B2 | 9/2014 | Raffles et al. |
| 8,900,394 B2 | 12/2014 | Raffles et al. |
| 9,102,025 B2 | 8/2015 | Raffles et al. |
| 9,272,379 B2 | 3/2016 | Fessler-Knobel et al. |
| 9,403,296 B2 | 8/2016 | Hachtmann et al. |
| 10,227,874 B2 | 3/2019 | Heinrich et al. |
| 10,336,003 B2 | 7/2019 | De Meter et al. |
| 2004/0061346 A1 | 4/2004 | Capewell |
| 2012/0175055 A1* | 7/2012 | Fessler-Knobel ...... B23Q 3/084 29/709 |
| 2015/0053336 A1 | 2/2015 | Lim et al. |
| 2017/0203471 A1 | 7/2017 | Obata et al. |
| 2019/0054585 A1 | 2/2019 | Jarvis et al. |
| 2019/0389018 A1 | 12/2019 | Mertens et al. |

FOREIGN PATENT DOCUMENTS

| | | |
|---|---|---|
| DE | 102010048337 A1 | 4/2012 |
| EP | 2002926 | 10/2010 |
| GB | 2500029 A | 9/2013 |
| JP | H06155117 A | 6/1994 |
| TW | M583377 U | 9/2019 |

\* cited by examiner

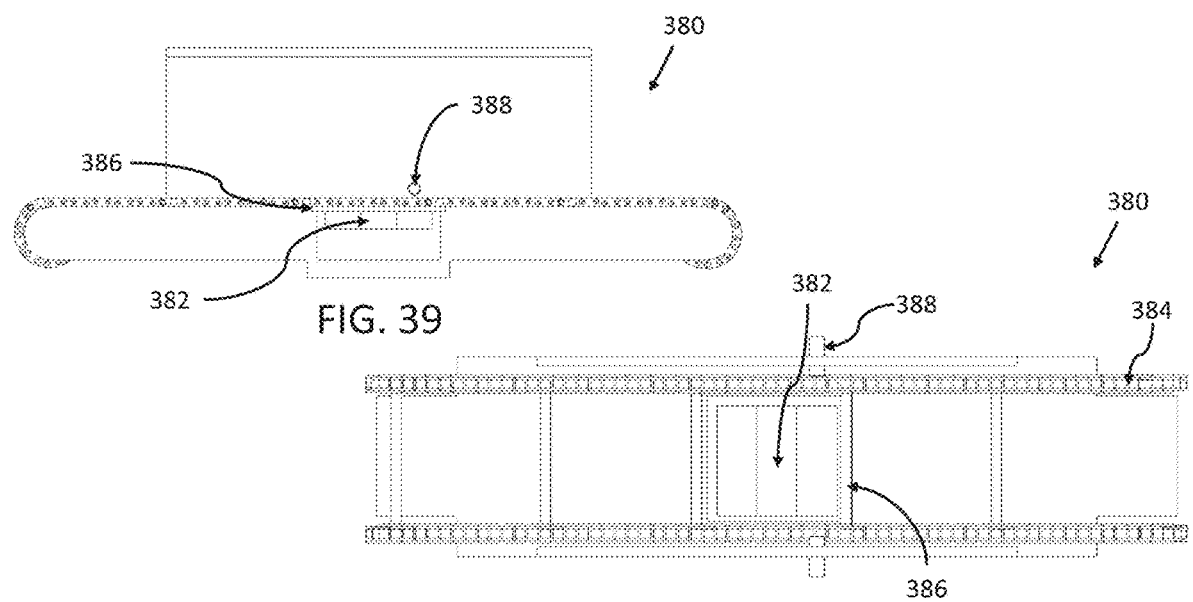

APPARATUS, METHOD AND SYSTEM TO TEMPORARILY HOLD A WORKPIECE DURING MANUFACTURING USING ADHESIVE ATTACHMENT

CROSS REFERENCE TO RELATED APPLICATION

This application claims priority to U.S. application Ser. No. 17/720,732 filed Apr. 14, 2022, which claims priority to Provisional Application No. 63/175,633, filed Apr. 16, 2021, the disclosure of which is hereby incorporated by reference in its entirety.

FIELD OF THE INVENTION

The present invention relates generally to workholding of parts during manufacturing processes and, more specifically, to holding a turbine blade element by adhesive attachment of a contoured surface of the turbine blade element to a complementary contoured surface of a support body.

BACKGROUND OF THE INVENTION

Turbine blades are workpieces that are machined using a material removal process consisting of grinding, milling, EDM/ECM or by other means. The current state of the art uses a plurality of methods to hold the blades during manufacture including low melt alloy encapsulation, and hard point fixtures. When securing turbine blades to the workholding device, current state of the art workholding suffers from inefficiencies and health related problems due to the use of heavy metals and acids to remove them, small surface areas for adhesion and workpiece distortion.

Low melt alloys are used to secure a workpiece to a shuttle by surrounding the workpiece with an alloy; this is referred to as encapsulation. To encapsulate a part, it is first located in a mold on the part locating datums, referred to as a datum locating nest. Once the part is loaded, the mold is closed and molten alloy is injected into the mold thereby forming a secondary datum locating scheme relative to the part datum set. The hot alloy can cause undesirable distortion of the shape of the blade by introducing thermal stresses into the blade material. After the alloy has cooled the mold is opened and the part, now surrounded by a metal matrix, is removed. Once the workpiece is processed and the encapsulation is no longer needed, the material is removed by splitting it in half to release the part. A portion of the alloy is remelted and reused. Encapsulation is both costly and an environmental concern due to the cost of the raw material and waste disposal. The workpiece must go through an acid bath to remove any remaining allow stuck to the turbine blade as the alloy will create hot spots on the turbine blade during operation causing premature failure. The low melt alloys are toxic, expensive, and can subject a worker to injury due to the heat required to melt the alloy.

Turbine blades are thin and compliant to reduce weight in an aircraft engine. These compliant blades are easily distorted due to their thin cross sections. When a turbine blade is clamped into a fixture against a predetermined locating nest defined by the part datums, the part is often distorted due to the clamping pressure which must be sufficient to prevent the part from moving during processing but weak enough to not damage the blade. During the manufacturing process of the raw investment cast turbine blades, individual differences arise within the blade shape that can cause the blades to load differently within the hard point tooling, further adding to part distortion.

Of secondary concern to hazardous materials and part distortion, there is a need to access the part features required to perform an operation. Hard fixtures accommodate this need to grind multiple surfaces by the use of multiple fixtures, repositioning the part as needed. But, sending a part through different fixtures adds error to the final product and also increases the risk of generating a bad part by improper part loading of the fixture.

FIG. 1 is a drawing from U.S. Pat. No. 8,341,841, illustrating a prior art approach to holding a workpiece. This drawing shows a component carrier 10 having a component body 12 and a composite material (shown in black) located on a component receptacle 14. The composite material is a woven or non-woven material and an adhesive. This design requires an anti-shrinkage component to be place between the workpiece and the carrier to prevent the workpiece from moving during the adhesive curing process. This method also requires the workpiece position to be measured before processing, causing increased cost and cycle time. This design does not allow for the complete machining of the workpiece in one fixturing and relies on each carrier to be identical, which is impractical and difficult to maintain in a production environment. The variation among the various carriers causes part variation and an inconsistent product.

FIG. 2 is a drawing from U.S. Pat. No. 10,227,874, illustrating another prior art approach to holding a workpiece. This drawing shows a tooling fixture assembly to hold a turbine blade 70. A transfer block 152 is attached to an end of the turbine blade using an ultraviolet-cured adhesive. Because the block 152 and blade 70 are opaque, curing only occurs at a perimeter edge where the blade meets the block. The block 152, with attached blade, is then positioned into a machining tool for processing.

FIG. 3 is a drawing from U.S. Pat. No. 9,272,379, illustrating yet another prior art approach to holding a workpiece. This drawing shows a method to hold a component using an adhesive. A component carrier 2 has adapters 16 and 18 formed of a transparent material. The adapters allow UV curing of the adhesive in the area of the adapters. This method is similar to U.S. Pat. No. 7,172,676 to DeMeter. This design relies on disposable adapters and only attaches the workpiece in discrete areas defined by the disposable adapters. The workpiece must be of a sufficient size to provide an adequate surface area to bond to in order to resist cutting forces without de-bonding the workpiece during the process of machining. Supporting the workpiece close to the machining area is difficult with this design. This method also increases cost due to the wasted disposable adapters required to practice the method.

There remains a need for an improved apparatus, methods and systems for temporarily holding a workpiece during manufacturing using adhesive attachment.

SUMMARY OF THE INVENTION

The present invention provides a workholding system and a method for temporarily holding a workpiece during one or more machining operations using adhesive attachment. In an example, the system and method are for holding a turbine blade element having a central blade portion and at least one end portion for attaching the turbine blade element to a turbine assembly. The turbine blade element may have an airfoil shape. An exemplary workholding system includes a workpiece shuttle that holds the workpiece and is moved with the workpiece between one or more manufacturing workstations. Typically, the workpiece has a contoured surface that may be adhesively attached to the shuttle. The workpiece shuttle has a support body with a contoured body surface complementary to the contoured surface of the workpiece. In examples, some or all of the contoured body surface of the support body is formed of a transparent material. The workpiece shuttle further has a base that is attached to and supports the support body so as to form the shuttle. In an example, the base has a plurality of zero-point locating elements for locating the base in a known position relative to a manufacturing workstation to allow for precision machining.

A bond station is configured to receive the shuttle, and has a plurality of zero-point locating elements that are complementary to the zero-point locating elements of the base of the shuttle. The shuttle is received on the bond station and is positioned in a predefined position by the complementary zero-point elements of the base and bond station. The workpiece, such as a turbine blade element is positioned on the shuttle in a predetermined position relative to the zero-point locating elements of the base. In an example, the bond station has a plurality of workpiece locating elements. In this example, the shuttle is in a predefined position relative to the bond station and the workpiece locating elements enable positioning of the workpiece on the shuttle on the predetermined position relative to the zero-point locating elements. As such, when the shuttle is positioned in a manufacturing workstation, using the zero-point locating elements, the workpiece is in a known position relative thereto and precision machining may occur. Clamps, not shown, may secure the workpiece during bonding.

A bonding zone is defined between the complementary portions of the workpiece and support body. In examples, the bonding zone may be at the portion formed of transparent material. In certain versions, the entire contoured body surface of the support body is formed of transparent material and the bonding zone is the entire area of the complementary surfaces. The contoured body surface of the support body may be larger than the contoured surface of the workpiece, in which case the bonding zone would be where the contoured surfaces are coextensive. An adhesive is applied to the bonding zone, such as being applied prior to positioning of the workpiece. The adhesive is then cured to temporarily fix the workpiece in the predetermined position relative to the zero-point locating elements of the shuttle base. In examples, the adhesive is UV curable and the curing is accomplished by illuminating the bonding zone through the transparent material. In examples, this provides a very large area of attachment, which reduces the load between any given point of the workpiece and the support; the loads are spread out of the large area.

The shuttle and workpiece may then be moved to one or more manufacturing workstations for one or more manufacturing processes. The turbine blade element may then be debonded from the shuttle. In an example, the debonding is accomplished using hot water or hot air. A ejection pin or element may also be provided, such as in the support body, and movement of the pin or element may bias the workpiece away from the shuttle. Another advantageous embodiment has a resistive load positioned opposite the adhesive side of the transparent material to thermal soften the workholding adhesive when a current is applied for efficient removal of the turbine blade element from the transparent material. Another embodiment uses an adhesive that contains nanoscintillators to cure an adhesive by the use of an energy discharge device. Another embodiment uses nano components within the adhesive to trigger a curing event by thermal or chemical reaction. This reaction may be triggered by magnetic, electronic, or other means. Another embodiment has a conductive substance mixed into the workholding adhesive to allow for induction heating of the adhesive to thermally soften the adhesive for workpiece removal from the shuttle.

In an embodiment, a method is provided for temporarily holding a workpiece during one or more manufacturing processes, the workpiece having a contoured surface. The method includes providing a workholding system having: a support body having a contoured body surface complementary to the contoured surface of the workpiece, at least a portion of the complementary portion of the contoured body surface formed of a transparent material, the at least a portion that is formed of transparent material defining a bonding zone; a base attached to and supporting the support body so as to form a workpiece shuttle, the base having a plurality of zero-point locating elements configured to locate the base relative to a manufacturing workstation; a bond station configured to receive the workpiece shuttle, the bond station having a plurality of zero-point locating elements complementary to the zero-point locating elements of the base. The method further includes the steps of: receiving the workpiece shuttle on the bond station; positioning the workpiece shuttle in a predefined position by the complementary zero-point locating elements of the base of the workpiece shuttle and the bond station; receiving the workpiece on the support body with the contoured surface of the workpiece adjacent the bonding zone; positioning the workpiece on the workpiece shuttle in a predetermined position relative to the zero-point locating elements of the base of the shuttle; applying a workholding adhesive to the bonding zone between the contoured surface of the workpiece and the complementary contoured body surface of the support body; curing the adhesive such that the workpiece is temporarily fixed in the predetermined position relative to the zero-point locating elements of the base of the workpiece shuttle; removing the workpiece shuttle, with the workpiece affixed thereto, from the bond station and moving the workpiece shuttle and workpiece to a first manufacturing workstation; performing at least one manufacturing process; and debonding the workpiece from the shuttle.

In examples, the bond station further includes a plurality of workpiece locating elements, and the step of positioning the workpiece on the workpiece shuttle includes positioning the workpiece on the workpiece shuttle in the predetermined position relative to the zero-point locating elements of the base of the workpiece shuttle by the plurality of workpiece locating elements of the bond station.

In examples, the support body includes two gripping devices each having a contoured body surface complementary to a portion of the contoured surface of the workpiece, each of the gripping devices having at least a portion of their contoured body surface formed of the transparent material, the at least a portion that is formed of transparent material of each of the gripping devices together defining the bonding zone. The two gripping devices may be spaced apart.

In examples, each of the gripping devices is formed of the transparent material or the support body is formed of the transparent material.

In examples, the workholding adhesive is a UV curable workholding adhesive, and the step of curing the adhesive includes illuminating the adhesive in the bonding zone through the transparent material, thereby curing the adhesive.

In examples, the step of illuminating the adhesive includes: providing a UV curing station having a UV light source; disposing the bond station, with the workpiece shuttle and workpiece thereon, in the UV curing station; and illuminating the adhesive using the UV curing station. The UV curing station may include a UV conveyor having a UV light source and a conveying element, and the step of disposing the bond station, with the workpiece shuttle and workpiece thereon, in the UV curing station includes: disposing the bond station, with the workpiece shuttle and workpiece thereon, on the conveying element; and moving the bond station, with the workpiece shuttle and workpiece thereon, relative to the UV light source by the conveying element. The conveying element may be disposed above the UV light source such that the conveying element moves the bond station over the UV light source and UV light from the UV light sources passes upwardly through one or more openings in the workpiece shuttle and bond station so as to illuminate the bonding zone.

In examples, the step of illuminating the adhesive includes providing a UV light source disposed in the workpiece shuttle and illuminating the adhesive using the UV light source. The gripping devices may each have a pocket and the UV light source may be a UV light source received in each pocket. The UV light source may be connected to a power source outside the workpiece shuttle by electrical connectors or the UV light source may be self-contained and includes a power source, the UV light sources being in wireless communication with a control.

In examples, the support body is formed entirely of the transparent material the workpiece shuttle further includes a UV light source disposed in or adjacent to the transparent material and configured to illuminate the bonding zone.

In examples, the workpiece is a turbine blade element having a central blade portion and at least one end portion, the central blade portion having a contoured blade surface defining the contoured surface of the workpiece.

In examples, the workpiece shuttle may further include an upper portion with second support body, the second support body having a contoured body surface complementary to an additional contoured surface of the workpiece, an additional bonding zone defined where the contoured body surface of the second support body is coextensive with the additional contoured surface of the workpiece, and the method may further include moving the upper portion of the workpiece shuttle from an open position to a closed position wherein the contoured body surface of the second support body is adjacent the additional contoured surface of the workpiece.

In examples, the method further includes applying the adhesive to the additional bonding zone, and the curing step includes curing the adhesive in both bonding zones.

In examples, at least a portion of the contoured body surface of the second support body is formed of a transparent material, or the second support body is formed of the transparent material.

In another embodiment, a workholding system is provided for temporarily holding a workpiece during one or more manufacturing processes, the workpiece having a contoured surface. The system includes: a support body having a contoured body surface complementary to the contoured surface of the workpiece, at least a portion of the complementary portion of the contoured body surface formed of a transparent material, the at least a portion that is formed of transparent material defining a bonding zone; a base attached to and supporting the support body so as to form a workpiece shuttle, the base having a plurality of zero-point locating elements configured to locate the base relative to a manufacturing workstation; and a bond station configured to receive the workpiece shuttle, the bond station having a plurality of zero-point locating elements complementary to the zero-point locating elements of the base, the bond station further having a plurality of workpiece locating elements operable to locate the workpiece disposed on the support body of the workpiece shuttle when the workpiece shuttle is received by the bond station, the workpiece locating elements positioning the workpiece on the workpiece shuttle in a predetermined position relative to the zero-point locating elements of the base of the workpiece shuttle.

In examples, the support body includes two gripping devices each having a contoured body surface complementary to a portion of the contoured surface of the workpiece, each of the gripping devices having at least a portion of their contoured body surface formed of the transparent material, the at least a portion that is formed of transparent material of each of the gripping devices together defining the bonding zone. The two gripping devices may be spaced apart.

In examples, each of the gripping devices is formed of the transparent material or the support body is formed of the transparent material.

In examples, the temporary holding comprises an adhesive holding with a UV curable workholding adhesive. The system may further include a UV curing station having a UV light source operable to illuminate and cure the adhesive.

In examples, the UV curing station includes a UV conveyor having a UV light source and a conveying element, the conveying element being disposed above the UV light source such that the conveying element is operable to move the bond station over the UV light source and UV light from the UV light sources passes upwardly through one or more openings in the workpiece shuttle and bond station so as to illuminate the bonding zone.

In examples, the system further includes a UV light source disposed in the workpiece shuttle operable to illuminate the adhesive using the UV light source. The gripping devices may each have a pocket and the UV light source comprises a UV light source received in each pocket. The UV light source may be connected to a power source outside the workpiece shuttle by electrical connectors or the UV light source may be self-contained and includes a power source, the UV light sources being in wireless communication with a control.

In examples, the support body is formed entirely of the transparent material and the workpiece shuttle further includes a UV light source disposed in or adjacent to the transparent material and configured to illuminate the bonding zone.

In examples, the workpiece is a turbine blade element having a central blade portion and at least one end portion, the central blade portion having a contoured blade surface defining the contoured surface of the workpiece.

In examples, the workpiece shuttle further includes an upper portion with second support body, the second support body having a contoured body surface complementary to an additional contoured surface of the workpiece, an additional bonding zone defined where the contoured body surface of the second support body is coextensive with the additional contoured surface of the workpiece, the upper portion of the workpiece shuttle being movable from an open position to a closed position wherein the contoured body surface of the second support body is adjacent the additional contoured surface of the workpiece. At least a portion of the contoured body surface of the second support body may formed of a transparent material, or the second support body may be formed of the transparent material.

In a further embodiment, a method is provided for temporarily holding a turbine blade element during one or more manufacturing processes, the turbine blade element having a central blade portion and at least one end portion, the central blade portion having a contoured blade surface. The method includes providing a workholding system having: a support body having a contoured body surface complementary to the contoured blade surface, the complementary portion of the contoured body surface defining a bonding zone entirely formed of a transparent material; a base attached to and supporting the support body so as to form a workpiece shuttle, the base having a plurality of zero-point locating elements configured to locate the base relative to a manufacturing workstation, the base further having a support face; and a bond station configured to receive the shuttle, the bond station having a plurality of zero-point locating elements complementary to the zero-point locating elements of the base, the bond station further having a plurality of workpiece locating elements. The method includes the steps of: receiving the shuttle on the bond station; positioning the shuttle in a predefined position by the complementary zero-point locating elements of the base and bond station; receiving the turbine blade element on the support body with the contoured blade surface adjacent the bonding zone; positioning the turbine blade element on the shuttle in a predetermined position relative to the zero-point locating elements of the base of the shuttle by the plurality of workpiece locating elements of the bond station; applying a UV curable workholding adhesive to the bonding zone between the contoured blade surface and the complementary body surface; illuminating the adhesive in the bonding zone through the transparent material with UV, thereby curing the adhesive such that the turbine blade element is temporarily fixed in the predetermined position relative to the zero-point locating elements of the base of the shuttle; removing the shuttle, with the turbine blade element affixed thereto, from the bond station and moving the shuttle and turbine blade element to a first manufacturing workstation; performing at least one manufacturing process; and debonding the turbine blade element from the shuttle.

In examples, the step of illuminating the adhesive includes: providing a UV curing station having a UV light source; disposing the bond station, with the shuttle and turbine blade element thereon, in the UV curing station; and illuminating the adhesive using the UV curing station.

In examples, the UV curing station includes a UV conveyor having a UV light source and a conveying element, and the step of disposing the bond station, with the shuttle and turbine blade element thereon, in the UV curing station includes disposing the bond station, with the shuttle and turbine blade element thereon, on the conveying element and moving the bond station, with the shuttle and turbine blade element thereon, relative to the UV light source by the conveying element.

In examples, the conveying element is disposed above the UV light source such that the conveying element moves the bond station over the UV light source and UV light from the UV light source passes upwardly through one or more openings in the shuttle and bond station so as to illuminate the bonding zone.

In examples, the support body is formed entirely of the transparent material, and the workpiece shuttle further includes a UV light source disposed in or adjacent to the transparent material and configured to illuminate the bonding zone.

In examples, the support body includes two gripping devices each having a contoured body surface complementary to a portion of the contoured surface of the workpiece, each of the gripping devices having at least a portion of their contoured body surface formed of the transparent material, the at least a portion that is formed of transparent material of each of the gripping devices together defining the bonding zone. The two gripping devices may be spaced apart, and may be formed of the transparent material.

In examples, the step of illuminating the adhesive includes providing a UV light source disposed in the workpiece shuttle and illuminating the adhesive using the UV light source. The gripping devices may each have a pocket and the UV light source is a UV light source received in each pocket.

In examples, the workpiece shuttle further includes an upper portion with a second support body, the second support body having a contoured body surface complementary to an additional contoured surface of the workpiece, an additional bonding zone defined where the contoured body surface of the second support body is coextensive with the additional contoured surface of the workpiece, and the method further includes moving the upper portion of the workpiece shuttle from an open position to a closed position wherein the contoured body surface of the second support body is adjacent the additional contoured surface of the workpiece.

In examples, the method further includes applying the adhesive to the additional bonding zone, the illuminating step comprising illuminating the adhesive in both bonding zones.

In examples, at least a portion of the contoured body surface of the second support body is formed of a transparent material or the second support body is entirely formed of the transparent material.

In yet another embodiment, a method is provided for temporarily holding a workpiece during one or more manufacturing processes, the workpiece having a contoured surface. The method includes providing a workholding system having: a support body having a contoured body surface complementary to the contoured surface of the workpiece, at least a portion of the complementary portion of the contoured body surface formed of a transparent material, the at least a portion that is formed of transparent material defining a bonding zone; a base attached to and supporting the support body so as to form a workpiece shuttle, the base having a plurality of zero-point locating elements configured to locate the base relative to a manufacturing workstation, the base further having a support face; and a bond station configured to receive the shuttle, the bond station having a plurality of zero-point locating elements complementary to the zero-point locating elements of the base, the bond station further having a plurality of workpiece locating elements. The method includes the steps of: receiving the shuttle on the bond station; positioning the shuttle in a predefined position by the complementary zero-point locating elements of the base and bond station; receiving the workpiece on the support body with the contoured surface adjacent the bonding zone; positioning the workpiece on the shuttle in a predetermined position relative to the zero-point locating elements of the base of the shuttle by the plurality of workpiece locating elements of the bond station; applying a UV curable workholding adhesive to the bonding zone between the contoured surface of the workpiece and the complementary body surface; illuminating the adhesive in the bonding zone through the transparent material with UV, thereby curing the adhesive such that the workpiece is temporarily fixed in the predetermined position relative to the zero-point locating elements of the base of the shuttle;

removing the shuttle, with the workpiece affixed thereto, from the bond station and moving the shuttle and workpiece to a first manufacturing workstation; performing at least one manufacturing process; and debonding the workpiece from the shuttle.

In examples, the workpiece shuttle further includes an upper portion with a second support body, the second support body having a contoured body surface complementary to an additional contoured surface of the workpiece, an additional bonding zone defined where the contoured body surface of the second support body is coextensive with the additional contoured surface of the workpiece, and the method further includes moving the upper portion of the workpiece shuttle from an open position to a closed position wherein the contoured body surface of the second support body is adjacent the additional contoured surface of the workpiece. The step of applying adhesive includes applying adhesive to both bonding zones and the step of illuminating includes illuminating the adhesive in both bonding zones with UV.

In examples, the step of illuminating the adhesive includes: providing a UV curing station having a UV light source, the UV curing station having a UV light source and a conveying element, the conveying element disposed above the UV light source such that the conveying element moves the bond station over the UV light source; disposing the bond station, with the workpiece shuttle and workpiece thereon, in the UV curing station; and illuminating the adhesive using the UV curing station, the UV light from the UV light source passing upwardly through one or more openings in the workpiece shuttle and bond station so as to illuminate the bonding zone.

BRIEF DESCRIPTION OF THE DRAWINGS

FIG. 39 is a cross sectional view of an embodiment of a conveyor;

FIG. 40 is a top view of portions of the conveyor of FIG. 39;

DETAILED DESCRIPTION OF THE INVENTION

Figure 1:
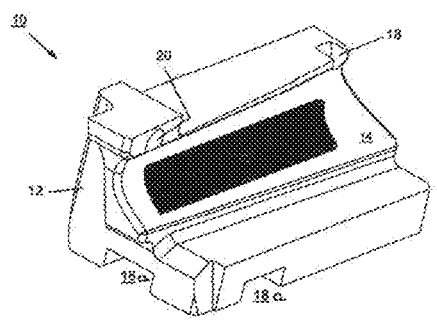
FIG. 1 is a perspective view of a prior art adhesive fixture.
Figure 2:
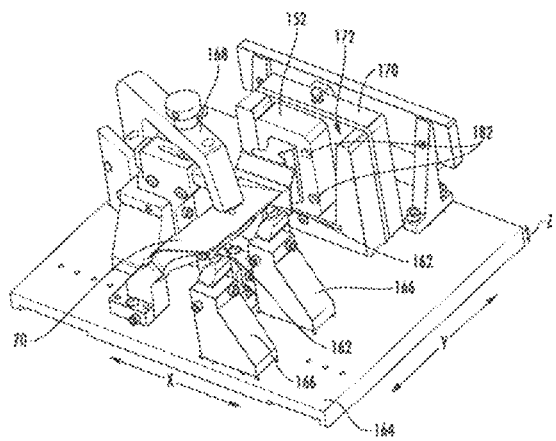
FIG. 2 is a perspective view of a prior art workpiece locating system.
Figure 3:
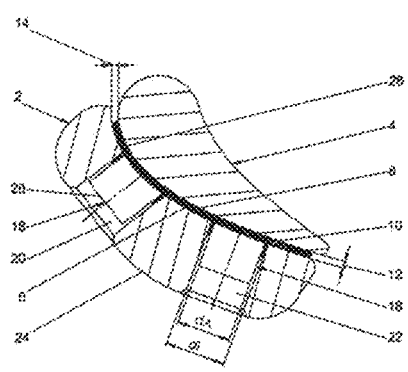
FIG. 3 is a cross sectional side view of another prior art approach to providing an adhesive fixture.

The present invention provides a workholding system and a method for temporarily holding a workpiece during one or more machining operations using adhesive attachment. In an example, the system and method are for holding a turbine blade element having a central blade portion and at least one end portion for attaching the turbine blade element to a turbine assembly. The turbine blade element may have an airfoil shape. An exemplary workholding system includes a workpiece shuttle that holds the workpiece and is moved with the workpiece between one or more manufacturing workstations. Typically, the workpiece has a contoured surface that may be adhesively attached to the shuttle. The workpiece shuttle has a support body with a contoured body surface complementary to the contoured surface of the workpiece. In examples, some or all of the contoured body surface of the support body is formed of a transparent material. The workpiece shuttle further has a base that is attached to and supports the support body so as to form the shuttle. In an example, the base has a plurality of zero-point locating elements for locating the base in a known position relative to a manufacturing workstation to allow for precision machining.

A bond station is configured to receive the shuttle, and has a plurality of zero-point locating elements that are complementary to the zero-point locating elements of the base of the shuttle. The shuttle is received on the bond station and is positioned in a predefined position by the complementary zero-point elements of the base and bond station. The workpiece, such as a turbine blade element is positioned on the shuttle in a predetermined position relative to the zero-point locating elements of the base. In an example, the bond station has a plurality of workpiece locating elements. In this example, the shuttle is in a predefined position relative to the bond station and the workpiece locating elements enable positioning of the workpiece on the shuttle on the predetermined position relative to the zero-point locating elements. As such, when the shuttle is positioned in a manufacturing workstation, using the zero-point locating elements, the workpiece is in a known position relative thereto and precision machining may occur. Clamps, not shown, may secure the workpiece during bonding.

A bonding zone is defined between the complementary portions of the workpiece and support body. In examples, the bonding zone may be at the portion formed of transparent material. In certain versions, the entire contoured body surface of the support body is formed of transparent material and the bonding zone is the entire area of the complementary surfaces. The contoured body surface of the support body may be larger than the contoured surface of the workpiece, in which case the bonding zone would be where the contoured surfaces are coextensive. An adhesive is applied to the bonding zone, such as being applied prior to positioning of the workpiece. The adhesive is then cured to temporarily fix the workpiece in the predetermined position relative to the zero-point locating elements of the shuttle base. In examples, the adhesive is UV curable and the curing is accomplished by illuminating the bonding zone through the transparent material. In examples, this provides a very large area of attachment, which reduces the load between any given point of the workpiece and the support; the loads are spread out of the large area.

The shuttle and workpiece may then be moved to one or more manufacturing workstations for one or more manufacturing processes. The turbine blade element may then be debonded from the shuttle. In an example, the debonding is accomplished using hot water or hot air. A ejection pin or element may also be provided, such as in the support body, and movement of the pin or element may bias the workpiece away from the shuttle. Another advantageous embodiment has a resistive load positioned opposite the adhesive side of the transparent material to thermal soften the workholding adhesive when a current is applied for efficient removal of the turbine blade element from the transparent material. Another embodiment uses an adhesive that contains nanoscintillators to cure an adhesive by the use of an energy discharge device. Another embodiment uses nano components within the adhesive to trigger a curing event by thermal or chemical reaction. This reaction may be triggered by magnetic, electronic, or other means. Another embodiment has a conductive substance mixed into the workholding adhesive to allow for induction heating of the adhesive to thermally soften the adhesive for workpiece removal from the shuttle.

Specific embodiments of the present invention will now be described. It should be understood that the invention is not limited to these specific embodiments. Also, any feature or element discussed with any embodiment may be used with any other embodiment, as will be clear to those of skill in the art.

Figure 4:
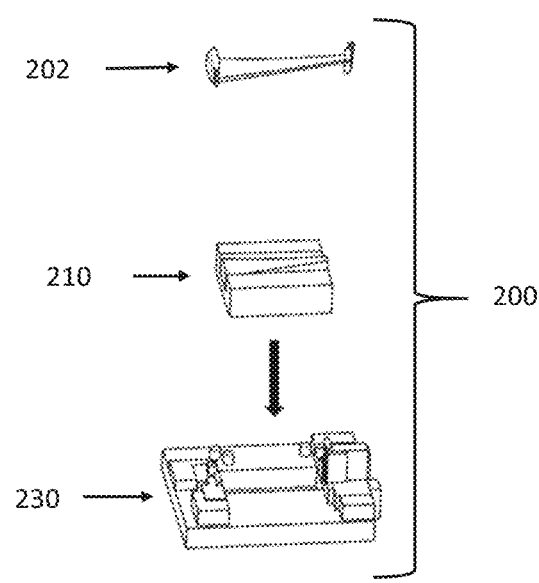
FIG. 4 is an exploded perspective view of an embodiment of a workholding system according to the present invention.
Figure 5:
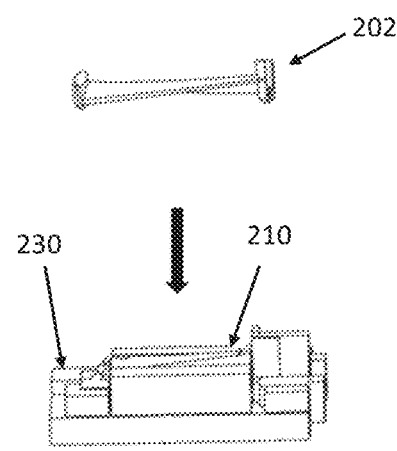
FIG. 5 is a perspective view similar to FIG. 4 but with the workpiece shuttle received in the bond station.
Figure 6:
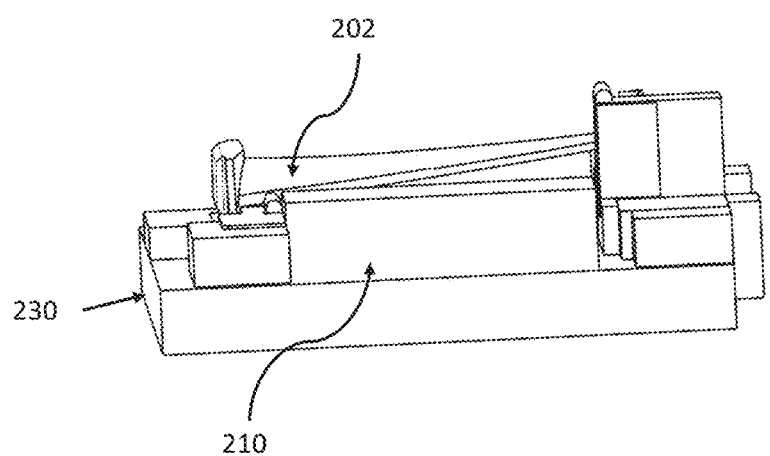
FIG. 6 is a perspective view similar to FIG. 5 but with the turbine blade element located on the shuttle in the bond station.

Referring now to FIG. 4, an exemplary workholding system 200 includes a shuttle 210 and a bond station 230. The workpiece 202, which in this example is a turbine blade element, may be considered part of the system, or the system may be separate from the workpiece. In use, the shuttle 210 is received on the bond station 230 as shown in FIG. 5 and the workpiece 202 is received on the shuttle 210 as shown in FIG. 6. The above described steps may then be carried out.

The details of an embodiment of an exemplary workholding system will be described in more detail with respect to FIGS. 7-17. Like numbers are used for like-named parts throughout the specification for consistency, but do not require that all like-numbered parts are identical.

Figure 7:
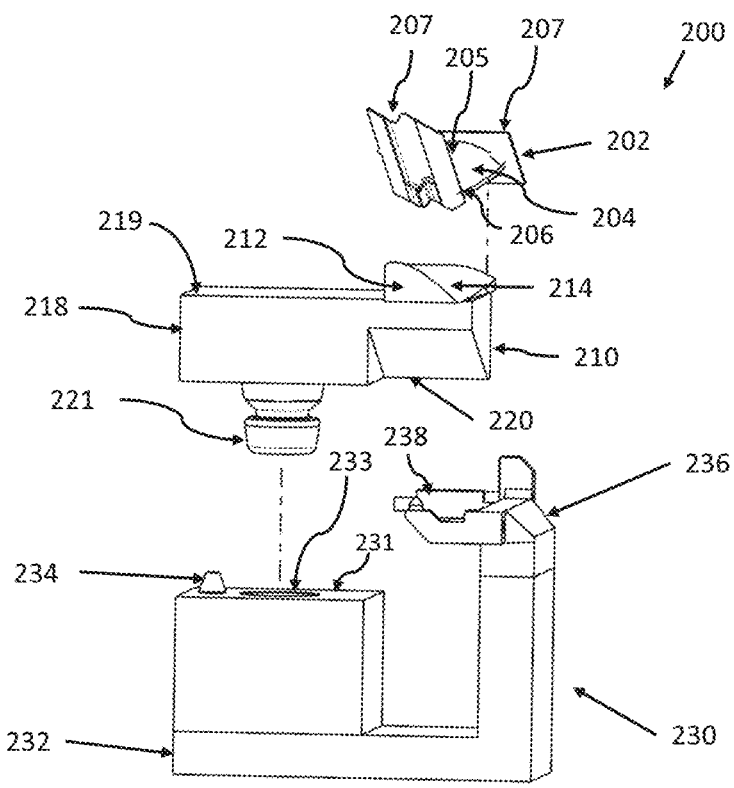
FIG. 7 is an exploded side perspective view of a turbine blade element, shuttle and bond station according to another embodiment of the present invention.
Figure 8:
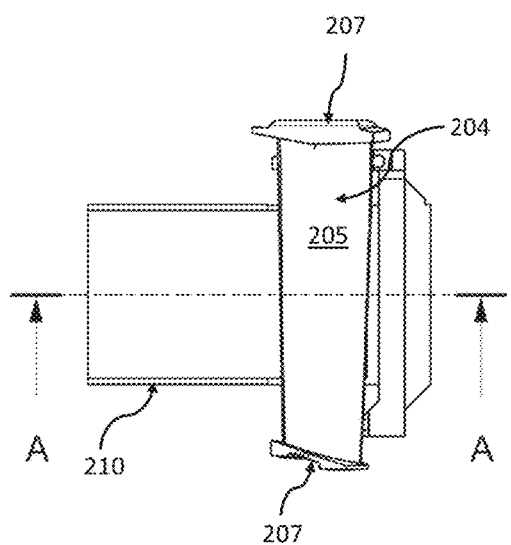
FIG. 8 is a top view of the workholding system of FIG. 7.
Figure 9:
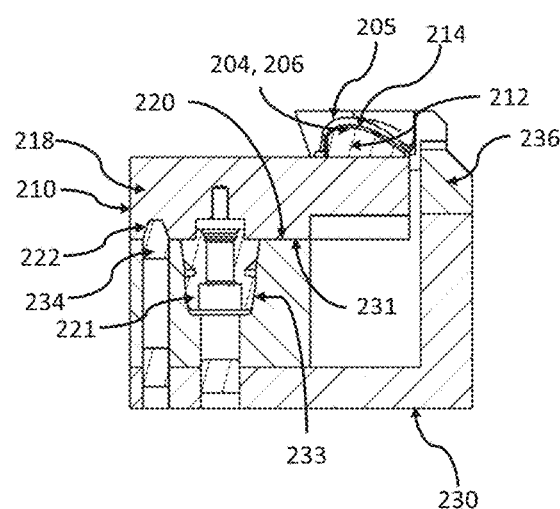
FIG. 9 is a cross sectional view of the workholding system of FIG. 8 taken along lines A-A.

FIG. 7 provides an exploded side perspective view of a workpiece or turbine blade element 202, workpiece shuttle 210 and bond station 230 according to an embodiment of the present invention. FIG. 8 provides a top view of the workholding system of FIG. 7 with the turbine blade element 202 and shuttle 210 received in the bond station 230. FIG. 9 provides a cross sectional view of the workholding system of FIG. 8 taken along lines A-A.

In this example, the turbine blade element 202 has a central blade portion 204 extending between a pair of end portions 207 defining opposed ends of the turbine blade element. In this example, the end portions 207 enable the turbine blade element 202 to be assembled to a larger turbine structure. In this example, the central blade portion 204 may be said to have a top face 205 and a bottom face 206, with terms such as top and bottom being in reference to the drawings but not being limiting on the structure. In this example, the bottom face 206 also defines a contoured blade surface 204 for attaching the turbine blade element to the shuttle. As used herein, a contoured surface means a non-flat surface, which may have a complex geometry.

Figure 10:
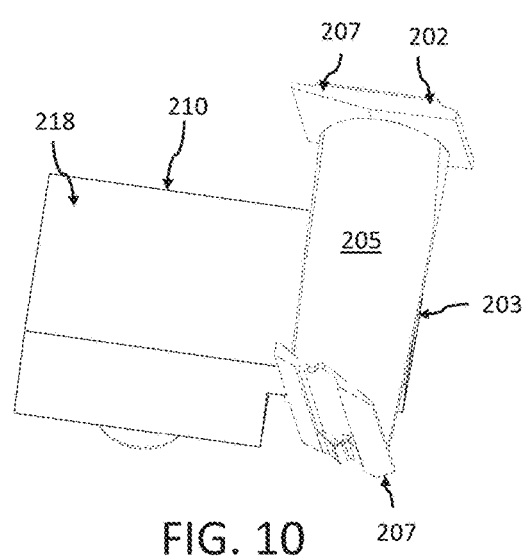
FIG. 10 is a top perspective view of the workpiece shuttle and blade of the system of FIGS. 7-9.
Figure 11:
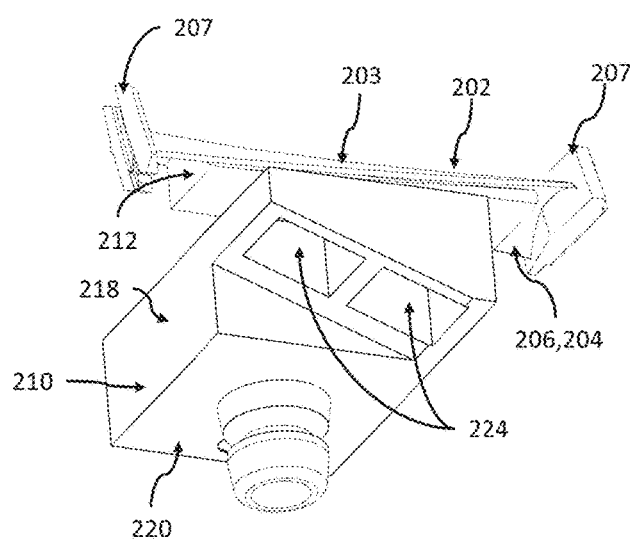
FIG. 11 is a bottom perspective view of the workpiece shuttle and blade of FIG. 10.

Referring now to FIGS. 7-11, the workpiece shuttle 210 will be described in more detail. FIG. 10 provides a top perspective view of the workpiece shuttle and turbine blade element of the system of FIGS. 7-9. FIG. 11 provides a bottom perspective view of the workpiece shuttle and turbine blade element of FIG. 10. In this example, the workpiece shuttle 210 has a support body 212 on its upper face. The support body 212 has a contoured body surface 214 that is shaped so as to be complementary to the contoured blade surface 204. As used herein, complementary is defined as the shape fitting closely with the other shape. The support body may be unique to a given workpiece shape, such that different parts are held by different workpiece shuttles or support bodies. In this example, a bonding zone is defined as the area where the complementary surfaces are coextensive. The contoured body surface 214 of the support body 212 may be somewhat smaller than the entire bottom face 206 of the central blade portion 203 to avoid touching or interfering with the end portions 207. In further examples, the bonding zone may be one or more areas within the area where the complementary surfaces are coextensive. In certain embodiments, the entirety of the contoured body surface 214 is formed of a transparent material. In some embodiments, the entirety of the support body 212 is formed of a transparent material; the support body is a monolithic body of transparent material. A variety of transparent materials may be used, with sapphire being one useful example as it has a hard surface and is dimensionally stable. In certain further embodiments, only a portion of the support body 212 or contoured body surface 214 is formed of a transparent material. For example, only the bonding zone may be formed of transparent material or only an upper portion of the support body may be formed of transparent material.

The workpiece shuttle 210 further has a base 218 that is attached to and supports the support body 212. For example, they may be adhesively connected, brazed and/or mechanically interconnected. The base 218, in this example, has an upper face 219 and a lower face 220, with the support body 212 being disposed on the upper face 219.

The present invention seeks to provide precise locating of a workpiece, such as the turbine blade element 202, in various manufacturing processes. As known to those of skill in the art, a zero-point locating system is a system of complementary locating elements used on fixtures and manufacturing workstations for repeatedly and accurately positioning a workpiece without the need for taking additional measurement or performing position checks. As used herein, a zero-point locating system is any system that allows precise positioning of a workpiece shuttle relative to the bond station and to manufacturing workstations, without the need for taking additional measurement or performing position checks, whether or not such a system is commonly referred to as a zero-point locating system. Such systems may also include clamping elements for clamping the elements relative to each other.

In this example, the workpiece shuttle 210 has a first locating element 221 extending from the lower face 220 of the base 218 and a second locating element 222, in the form of a recess, defined in the lower face 220. As used herein, locating elements may be any physical feature that provides for precise locating.

Figure 12:
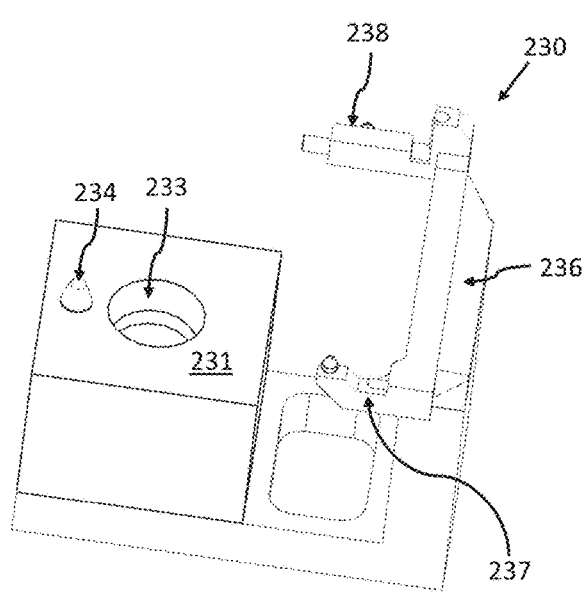
FIG. 12 is a top perspective view of the bond station of the system of FIGS. 7-9 configured to receive the workpiece shuttle of FIGS. 10 and 11.
Figure 13:
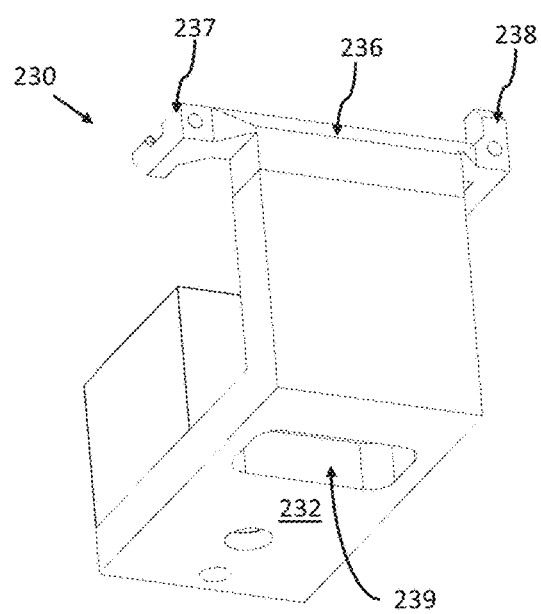
FIG. 13 is a bottom perspective view of the bond station of FIG. 12.

Referring now to FIGS. 7 and 12-13, the bond station 230 will be described in more detail. FIG. 7 was briefly described above. FIG. 12 provides a top perspective view of the bond station 230, which is configured to receive the workpiece shuttle 210 of FIGS. 10 and 11. FIG. 13 provides a bottom perspective view of the bond station 230.

The bond station 230 has zero-point locating elements complementary to the zero-point locating elements of the base of the workpiece shuttle. In this example, the bond station 230 has an upper face 231 and an opposed lower face 232. A first locating element 233 and a second locating element 234 are provided on the upper face. In this example, the first locating element 233 is a recess in the upper face 231 complementary to the first locating element 221 extending from the lower face 220 of the workpiece shuttle 210. In this example, the second locating element 234 is a spring loaded clocking pin that extends upwardly from the upper face 231 and is complementary to the recess 222 in the lower face of the workpiece shuttle 210.

In this example, the bond station also has an upper portion 236 having a plurality of workpiece locating elements. The workpiece locating elements are physical elements shapes so as to precisely position the workpiece 202 at a predetermined position. The workpiece locating elements may take a variety of forms, depending on the configuration of the workpiece. In this example, the workpiece locating elements take the form of a first locating arm 237 and a second locating arm 238 each extending from the upper portion 236 of the bond station 230 (see FIGS. 12 and 13). Each of the locating arms have precise positioning features that contact surfaces or features of the work piece such that when the workpiece 202 engages these features, the workpiece is in a precise predefined position relative to the bond station 230. As will be clear to one skilled in the art, a method to verify the locations of the locating part and shuttle can be provide through various means including non-contact sensors, contact sensors, coordinate measuring machine or a vision system.

Figure 18:
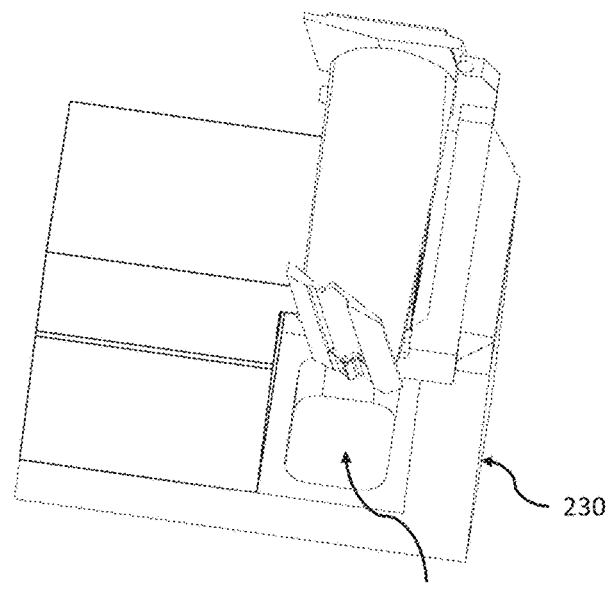
FIG. 18 is a top perspective view of the workpiece shuttle of FIGS. 10 and 11 received into the bond station of FIGS. 12 and 13, to form a workholding system.
Figure 19:
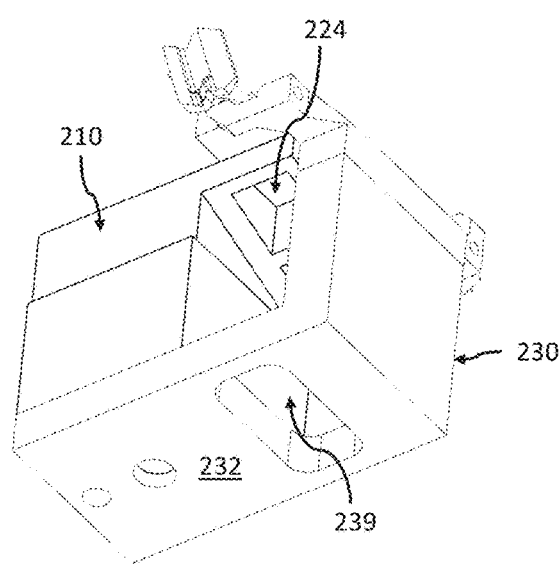
FIG. 19 is a bottom perspective view of the workholding system of FIG. 18.
Figure 20:
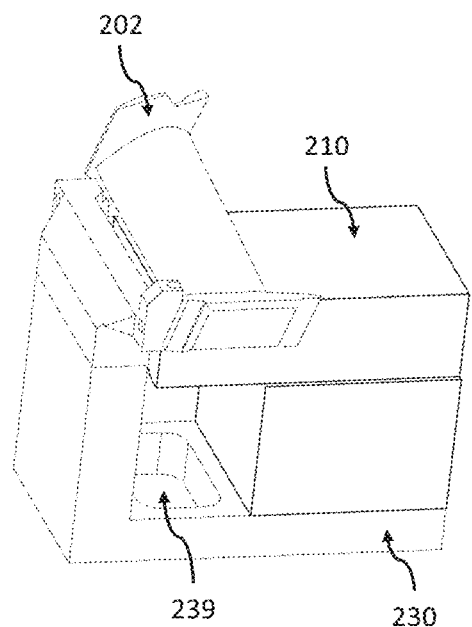
FIG. 20 is a side perspective view of the workholding system of FIGS. 18 and 19.
Figure 21:
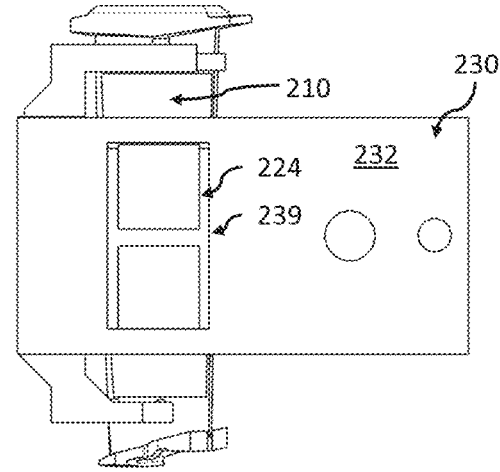
FIG. 21 is a bottom view of the workholding system of FIGS. 18-20.

FIGS. 7, 9 and 20-21 help to illustrate how the workpiece 202, workpiece shuttle 210 and bond station 230 work together. FIG. 18 provides a top perspective view of the workpiece shuttle of FIGS. 10 and 11 received into the bond station of FIGS. 12 and 13, to form a workholding system. FIG. 19 provides a bottom perspective view of the workholding system of FIG. 18. FIG. 20 provides a side perspective view and FIG. 21 provides a bottom view of the workholding system of FIGS. 18-21. As best shown in FIGS. 7 and 9, the workpiece shuttle 210 is received onto the bond station 230 with the upper face 231 of the bond station contacting, supporting, and being coplanar with the lower face 232 of the base 218 of the workpiece shuttle. The first locating element 221 of the workpiece shuttle 210 is received into the complementary first locating element 233 of the bond station 230. Likewise, the second locating element, or recess, 222 of the workpiece shuttle 210 receives the second locating element 234 of the bond station 230. The faces 220 and 231 also help to locate the workpiece shuttle relative to the bond station 230, by making contact and being coplanar, and therefore may also be considered as additional complementary locating elements. The workpiece shuttle is positioned in a predefined position by the complementary locating elements.

With the workpiece shuttle 210 received by the bond station 230, the workpiece 202 may now be positioned. As noted above, the bond station 230 has workpiece locating elements for locating the workpiece in a predetermined position. Because the complementary locating elements of the workpiece shuttle 210 and bond station 230 cooperate to position the shuttle in a predetermined position, the workpiece locating elements serve to locate the workpiece in a precise position relative to the locating elements of the shuttle. The workpiece 202 is positioned in the predetermined position, using the workpiece locating elements of the bond station. This also positions the contoured blade surface 204 of the turbine blade element 202 adjacent the contoured body surface 214 of the support body 212 of the workpiece shuttle. The workpiece locating elements may be connected to an electrical circuit to provide feedback from each locating element to verify the correct part and shuttle locations. The zero-point locating elements may also provide feedback. The feedback signal may be wireless.

An adhesive is applied to the bonding zone between the complementary surfaces of the workpiece 202 and the support body 212 and is cured. The adhesive may be applied to one or both surfaces prior to positioning the workpiece 202 on the workpiece locating elements of the bond station 230. In an advantageous embodiment, adhesive is applied to the bonding zone using a robot or a computer-controlled machine requiring no human intervention. The adhesive may be applied using a CNC machine tool using the machine driven axis to position a dispensing nozzle to the required position to dispense adhesive to the shuttle. Once the adhesive is cured, the workpiece is fixed in a predetermined position relative to the zero-point locating elements of the shuttle. The shuttle, with the workpiece fixed thereto, may then be removed from the bond station and moved to one or more manufacturing workstations. Each workstation will have locating elements that cooperate with the locating elements of the shuttle, thereby positioning the workpiece in a known position. In examples, no position check or adjustment is required for machining.

Figure 14:
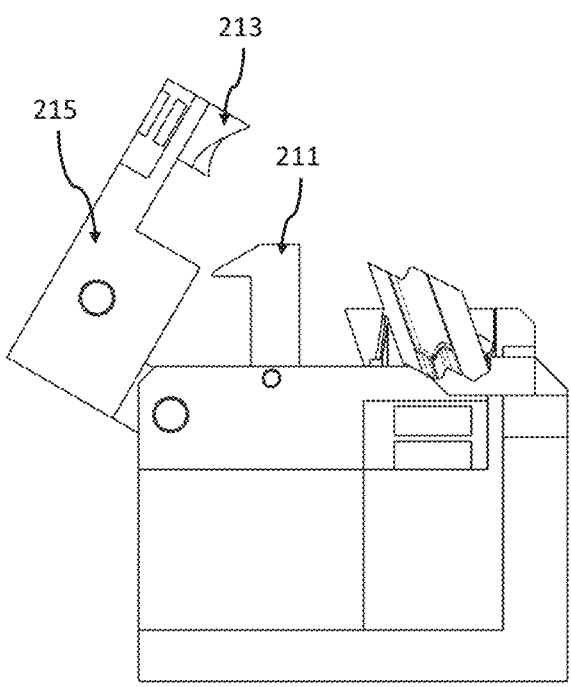
FIG. 14 is a side view of an alternative embodiment of a workpiece shuttle received into the bond station of FIGS. 12 and 13, to form a workholding system.
Figure 15:
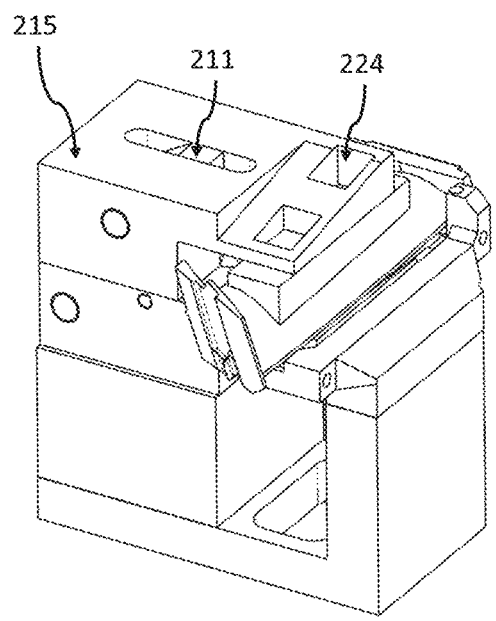
FIG. 15 is a perspective view of the workpiece shuttle and bond station of FIG. 14.
Figure 16:
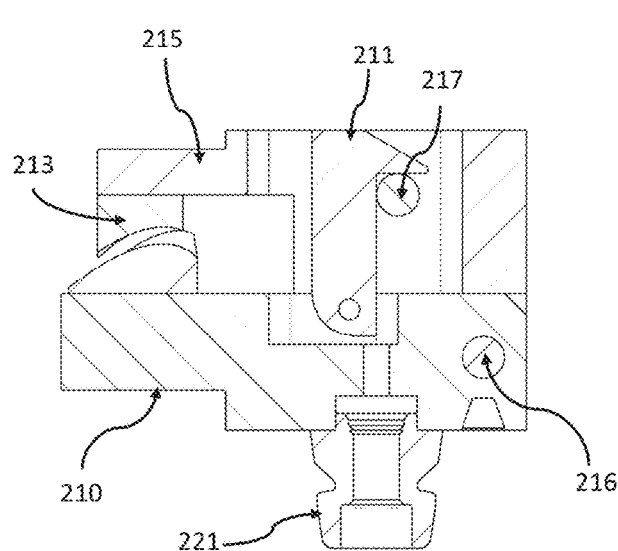
FIG. 16 is a cross sectional side view of the workpiece shuttle of FIGS. 14 and 15 without the bond station.
Figure 17:
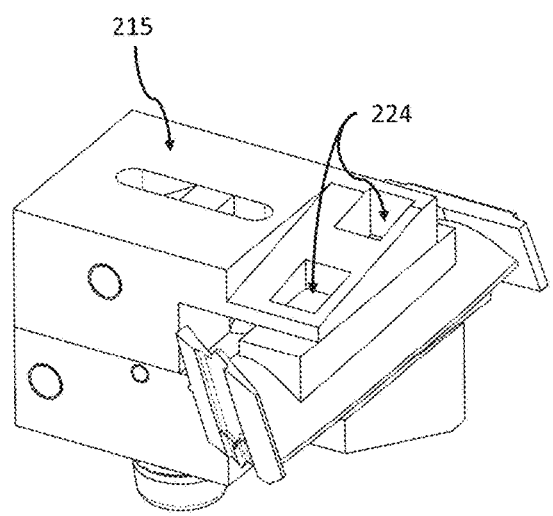
FIG. 17 is a perspective view of the workpiece shuttle of FIG. 16.

FIGS. 14-17 illustrate an alternative embodiment of a workpiece shuttle. The workpiece shuttle is similar to the workpiece shuttle 210 but includes additional elements. The common elements will not be further described. FIG. 14 is a side view of the alternative embodiment of the workpiece shuttle received into the bond station of FIGS. 12 and 13, to form a workholding system. FIG. 15 is a perspective view of the workpiece shuttle and bond station of FIG. 14. FIG. 16 is a cross sectional side view of the workpiece shuttle of FIGS. 14 and 15 without the bond station. FIG. 17 is a perspective view of the workpiece shuttle of FIG. 16.

This alternative workpiece shuttle has an upper portion or clam shell 215 that is pivotably connected to the remainder of the shuttle at pivot 216. It may be said to move between an open position and a closed position. The upper portion of clam shell 215 includes a second support body 213 that has a contoured body surface complementary to an additional contoured surface of a workpiece. In this example, the central blade portion of the turbine blade element has a top face 205 (see FIGS. 9 and 10) defining an additional contoured blade surface. The contoured body surface of the second support body 213 is complementary to this additional contoured body surface. After the turbine blade element is position on the support body, the upper portion or clam shell 215 may be moved from the open position to the closed position such that the second support body 213 is adjacent the additional contoured blade surface and may be adhesively attached thereto. An additional bonding zone is defined where the complementary surfaces are coextensive. The second support body may be partially or entirely formed of transparent material. Some or all of the contoured body surface of the second support body may be formed of the transparent material. A latch 211 may hold the upper portion or clam shell 215 in the closed position. The method may further include moving the upper portion to the open position after debonding.

A benefit of embodiments as just described is that the bond station locates the workpiece in a predetermined position relative to the locating elements of the shuttle, so part-to-part variation in the shuttles does not impact the precise positioning of the workpiece during subsequent machining operations. In an example, a single bond station is used with a plurality of shuttles, thereby requiring only the bond station to be precisely dimensioned, and subject to calibration checks, instead of having to do the same with each of the plurality of shuttles. It is noted that the adjacent contoured surfaces 204, 214 of the workpiece 202 and support body 212 may not be equidistant at all areas, due to variations in the workpiece shuttle 210. As an example, there may be tiny variations in the contoured body surface 214. The adhesive thickness may vary slightly in different areas. However, because the bond station precisely locates the workpiece relative to the locating elements of the workpiece shuttle, each workpiece is precisely located with the adhesive thickness variation compensating for variations in the shuttles. Providing the workpiece locating elements and doing the locating in the bond station, prior to machining, avoids exposing the high-precision bond station to machining forces and excess relocation. Only the shuttle is exposed to these forces and relocation, and the bond station compensates for shuttle-to-shuttle variance.

In an alternative embodiment, the workpiece shuttle may include workpiece locating elements for locating the workpiece relative thereto. These workpiece locating elements may be in addition to or in place of the workpiece locating elements on the bond station. However, having the workpiece locating elements on the bond station, and not on the workpiece shuttle, is advantageous in some applications.

Figure 22:
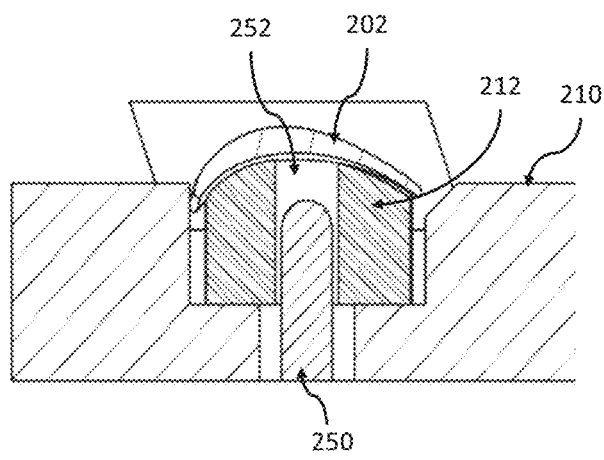
FIG. 22 is a cross sectional view of an embodiment of a shuttle showing an ejector device for de-bonding a part from a fixture, which may form a portion of some embodiments of the present invention.

After the desired manufacturing processes are complete, the workpiece is de-bonded and removed from the workpiece shuttle. This may be accomplished in a variety of ways. In certain versions, exposure to hot water or hot air accomplishes the debonding. FIG. 22 illustrates an ejector system that may assist in debonding. A portion of a workpiece shuttle is shown at 210, with a support body 212 supporting a workpiece 202. An ejector 250 extends up through a passage 252 in the shuttle support body 212. The ejector 250 may upwardly and push against the bottom face of the workpiece, thereby urging the workpiece away from the support body. This ejector 250 may be an integral part of the shuttle or it may be in a separate device. The ejector is operated in a linear fashion to separate the workpiece from the shuttle, or it may be a fixed object onto which the shuttle may be pressed.

The adhesive used to attach the workpiece to the support body may be of any type suitable for adhesively attaching the workpiece. In certain advantageous embodiments, the adhesive is an ultraviolet (UV) curable workholding adhesive that cures when exposed to UV light. In certain advantageous embodiments, this adhesive is debondable using hot air or hot water. In examples, the entire bonding zone is transparent and the entirety of the bonding zone is illuminated with UV through the transparent support body or support body portion.

Figure 23:
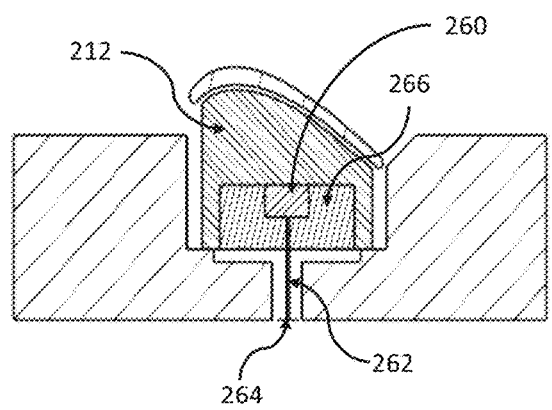
FIG. 23 is a cross section view similar to FIG. 22 but showing an embodiment of an ultraviolet generating device encapsulated into a transparent material, which may form a portion of some embodiments of the present invention.

The UV illumination may be accomplished in a variety of ways. In an example, as shown in FIG. 23 a UV light source 260 is embedded into the transparent material forming the support body 260. The light source 260 may have leads 262 that connect to pads 264 that allow for the operation of the light source 260 through external contacts with a power supply. For example, the bond station may have electrical contacts for powering the light source and for controlling the timing of the illumination. It will be noted that connections may include other functions such as health monitoring of the apparatus and process performance. The encapsulation material 266 used to embed the light source 260 may be a thermal heat sink material to draw heat away from the light source, typically an LED diode. The encapsulating material is also a sealing material to prevent fluid ingress into the area of the light source and other electronics.

Figure 24:
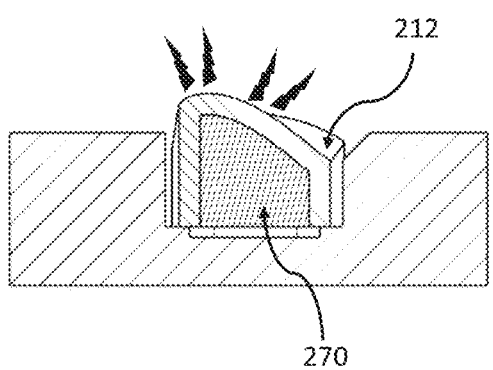
FIG. 24 is a cross section view similar to FIG. 22 but showing an embodiment of an encapsulant material inside of a workpiece support material which contains a radio frequency device to heat an adhesive, which may form a portion of some embodiments of the present invention.

In an alternative, as shown in FIG. 24, a non-optical device 270 may be inserted into a structural workholding support body 212 to cure an adhesive whether by thermal, induction coil, piezo, radio frequency dielectric or atomic excitation of the adhesive molecules. In this alternative, the support body may or may not be partially or entirely transparent. All such non-optical devices are may be coupled to external power sources as shown in FIG. 23. As a further alternative, a UV light source or non-optical device may have its own power supply, such as a battery, and therefore not require electrical connections. In one exemplary embodiment of the invention, the UV LEDs are assembled into an assembly with a heat sink then mounted into the shuttle. Provided on the shuttle or LED assembly is a means to seal off the UV LEDs to external contamination such as an O-ring or adhesive sealant. The electrical contacts are exposed to make an electrical connection with the LED controller. Wireless power transmission, such as through inductive coupling, may also be used to power the light or device. In each case, the light or device may be wirelessly controlled, so as to allow remote triggering. As an example, wireless UV curing heads may include a battery, UV source, Bluetooth or other means of triggering and monitoring the curing process from a distance, and a controller that would have a Bluetooth transmitter or other wireless protocol to trigger and monitor the curing process. The LED heads would handshake with a specific controller by placing the LED head onto the controller to "register" the LED head so multiple controllers/LED heads could be used in the same area. Optionally, a controller and LED heads could be tagged with matching colors or other means to identify that they go together. Remote triggering may be advantageous in avoiding exposure of workers to the energy sources. The energy released may be of a frequency or ultrashort time duration to not affect the workpiece material in a negative way.

Figure 25:
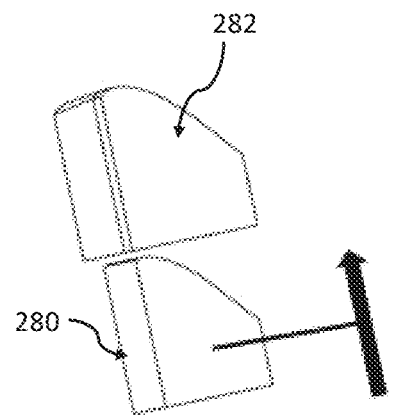
FIG. 25 is a schematic view showing how a light source may be inserted parallel into an optically transparent material forming part of a workpiece shuttle in certain embodiments.
Figure 26:
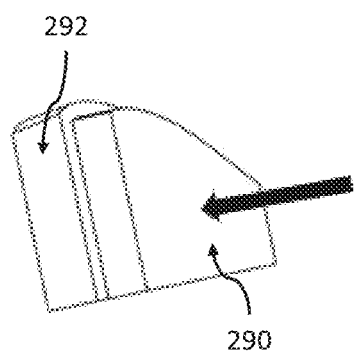
FIG. 26 is a schematic view showing how a light source may be inserted laterally into a transparent material forming part of a workpiece shuttle in certain embodiments.
Figure 27:
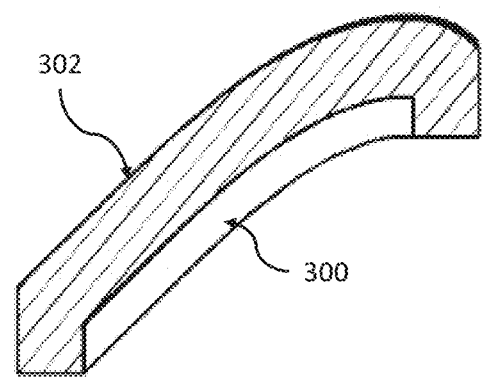
FIG. 27 is a cross sectional view showing a flexible light source conforming to the underside of a transparent material forming part of a workpiece shuttle in certain embodiments.

The UV or other energy device may be engaged with the shuttle in any of a variety of ways. For example, the device may be part of the bond station, with the shuttle having openings into which the devices fit when the shuttle is received in the bond station. This avoids duplication of energy devices and exposure of such devices to the various machining processes. FIG. 25 schematically illustrates an energy device 280 that slides up into a pocket in a support body 282. FIG. 26 schematically illustrates an energy device 290 received into an end of a support body 292. FIG. 27 schematically illustrates a flexible adhesive curing device 300 mounted in a support body 302, parallel to the contoured surface. The flexible curing device may be optical, thermal, induction coil, piezo or through atomic excitation of the adhesive molecules by coupling with nano components present in the workholding adhesive.

Figure 28:
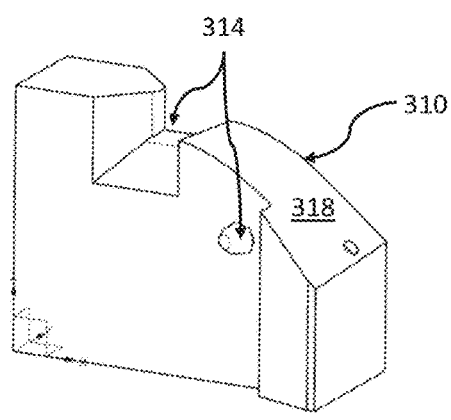
FIG. 28 is a perspective view of an alternative embodiment of a transparent component that contains integral locating areas.
Figure 29:
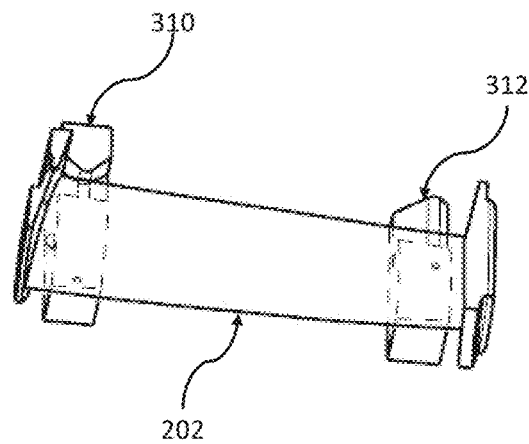
FIG. 29 is a perspective view of an alternative embodiment of a portion of a workpiece shuttle with a turbine blade element spanning two transparent locating components of FIG. 28.

In an alternative workholding system, the workpiece shuttle may take the form of individual gripping devices that cooperate to hold the workpiece. FIG. 28 provides a perspective view of an alternative embodiment of a gripping device, such as a transparent component 310, which would cooperate with a similar component 312 to support a workpiece 202 as shown in FIG. 29. Because the working area of the workpiece is at each end of the part it is not necessary to support the workpiece in the middle area. Once the workpiece is assembled by adhering the two individual gripping devices it can be referred to a gripping assembly or workpiece shuttle. The accurate positioning of the gripping devices is performed by the use of a bond station. The components 310 and 312 may have integral workpiece locating elements, 314, that accurately position the workpiece relative to the components and to a bond station. In an example, the components have contoured surfaces 318 that are complementary to corresponding areas on the workpiece 202, and the entirety of the contoured surface may be formed of transparent material to allow UV curing through the component surfaces. In this example, the bonding zone includes one zone for each component, where the component surface is coextensive with the workpiece surface. Energy devices may be received as shown in FIGS. 25-27.

Figure 30:
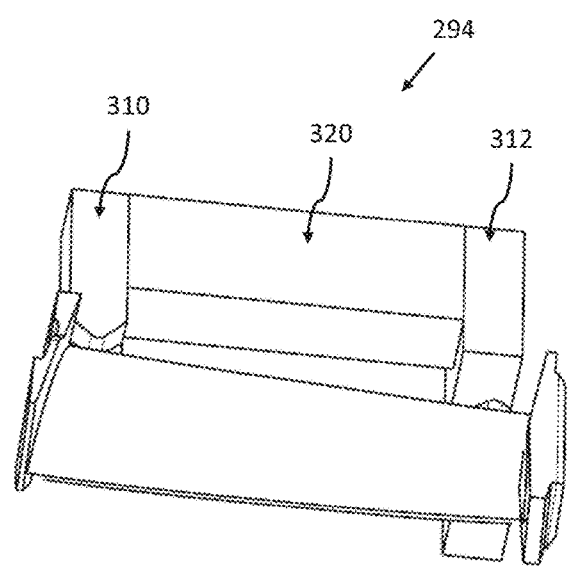
FIG. 30 is a perspective view of an alternative embodiment of a portion of a workpiece shuttle with a turbine blade element similar to FIG. 29 but with a tie-bar spanning two transparent locating components.

FIG. 30 provides a perspective view of an alternative embodiment of a portion of a workpiece shuttle with a turbine blade element similar to FIG. 29 but with a tie-bar 320 spanning two transparent locating components 310 and 312. Because the working area of the workpiece is at each end of the part it is not necessary to support the workpiece in the middle area. Once the workpiece is assembled by adhering the two individual gripping devices it can be referred to a gripping assembly 294. The accurate positioning of the gripping devices is performed by the use of a bond station, similar to that shown in FIG. 20. The tie-bar assembly provides for a means to attach a zero point locating system such as the one depicted earlier.

Figure 31:
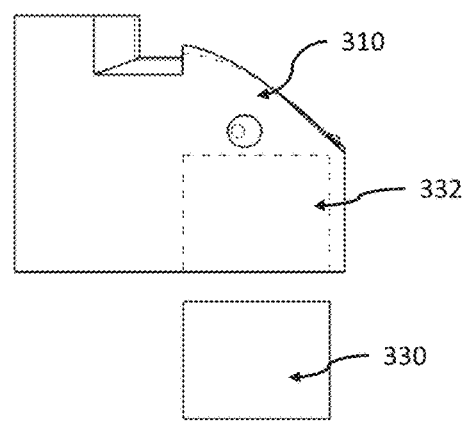
FIG. 31 is a side view of the transparent component showing an ultraviolet light source being inserted into the transparent component.

FIG. 31 depicts an insertable curing device 330 which is inserted into pocket 332 of a component 310.

Figure 32:
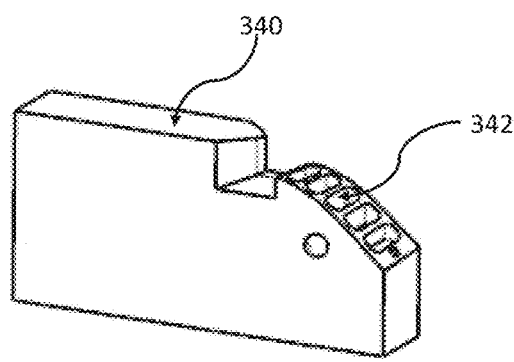
FIG. 32 is a perspective view of an alternative embodiment of a workpiece support portion of a workpiece shuttle that may be an additively printed metallic housing with slots to accept a pourable or injectable transparent material.
Figure 33:
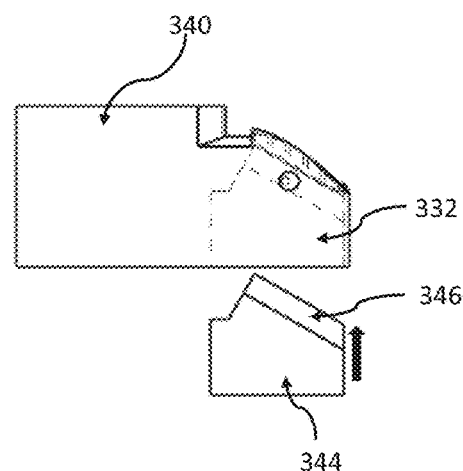
FIG. 33 is a side view of the portion of FIG. 32 showing insertion of an ultraviolet light source.

FIG. 32 provides a perspective view of a gripping device or component 340 which incorporates slots 342 in a contoured surface and a transparent material in the slots to transmit ultraviolet light into an adhesive for attachment to the workpiece. FIG. 33 shows the gripping device 340 and an insertable LED device 344 which includes an LED array 346 to provide the ultraviolet light.

Any of the herein described approaches to illuminating a bonding zone may also be used with the embodiment shown in FIGS. 14-17, such as by adding UV sources into the upper portion or providing upper UV sources to the bond station.

Figure 34:
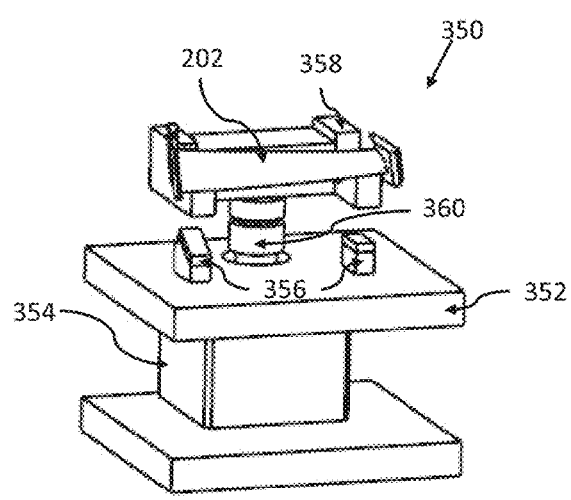
FIG. 34 is a perspective view of an embodiment of an adhesive bond station receiving a workpiece shuttle and workpiece, wherein the workpiece shuttle has individual locating components held together by a tie-bar apparatus, and also having a positioning device to align the system.

FIG. 34 shows a workholding system 350 comprised of a base 352, a zero point chucking device 354, adhesive curing devices 356, a workpiece shuttle 358, and the workpiece 202, 352, 354, are known collectively as a bond station. The zero point device is comprised of a locating and clamping system 354, 360 which accurately positions the shuttle 358 in a known position. Once the adhesive is solidified and the workpiece assembly, comprised of workpiece 202 and shuttle 358, are attached to one another, the zero point clamp is released and the part is introduced into the processing line. It is important to note that the entire bonding process, in this and other certain other embodiments, happens outside of the machine cycle, significantly increasing the amount of completed parts that can be processed in one day. Furthermore, the same zero point system used in the bond station may be used in multiple machine tools allowing for simple loading of complex shaped workpieces through the use of automation. The prior art of loading a complex shaped part, such as a turbine blade element into a hard point clamping fixture inside of a machine tool, is difficult and time consuming.

Furthermore, by using the same zero point system inside an inspection machine, a further reduction in processing time can be achieved. It should also be noted that by using the same zero point system throughout the production line, multiple part numbers may take advantage of the already mounted zero point system that is in the processing chain by simply using a separate bond station dedicated to a new part number.

Figure 35:
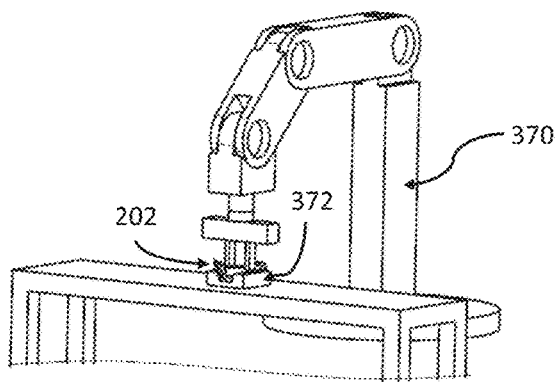
FIG. 35 is a perspective view showing a robot positioning a workpiece onto a shuttle.

FIG. 35 depicts a robot 370 loading a workpiece 202 onto a workpiece shuttle 372. It will also be noted that a robot may load a workpiece into bond station/shuttle system.

Figure 36:
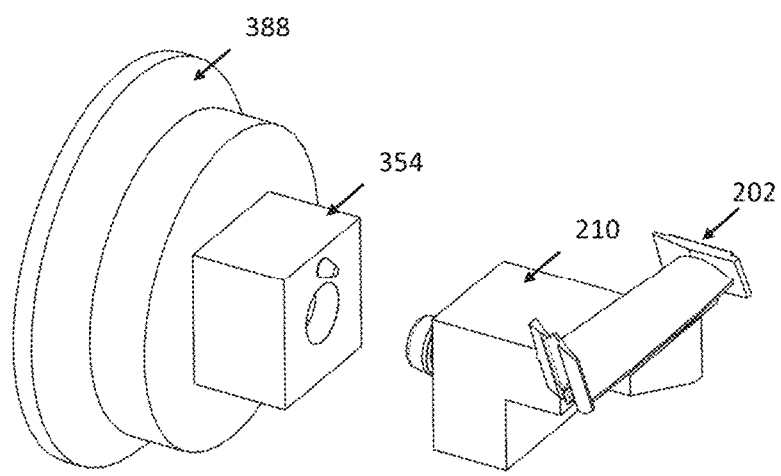
FIG. 36 is a perspective view depicting a 6th axis axis support for a workpiece shuttle.

FIG. 36 depicts a 6$^{th}$ axis 388 to rotate the shuttle 210 with workpiece 202 attached. This method provides a means to machine the entire workpiece.

Figure 37:
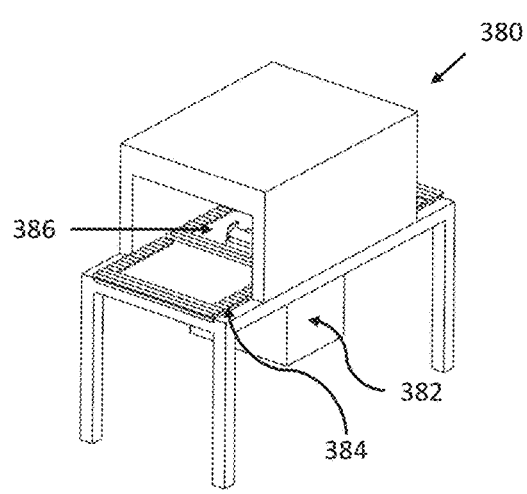
FIG. 37 is a perspective view showing a conveyor for curing an ultraviolet workholding adhesive.

FIG. 37 illustrates a conveyor system 380 with the adhesive curing source 382 mounted below a conveyor 384. Element 386 is a transparent material that allows ultraviolet light to be transmitted up through a bond station and shuttle on the conveyor 384 to expose the workholding adhesive to ultraviolet radiation to cure the adhesive. As part of the conveyor system 380, the conveyor belt 384 may have cutouts, as shown. Referring again to FIGS. the bond station 230 may have openings 239 in the lower face 232 to allow UV to pass from the curing source to the shuttle 210. Likewise, the shuttle 210 may have openings 224 to allow the UV to pass through to the transparent support body. The version of the shuttle shown in FIGS. 14-17 may also have openings 224 for UV to pass through. The conveyor system may have an additional UV source to illuminate the second support body 213.

Figure 38:
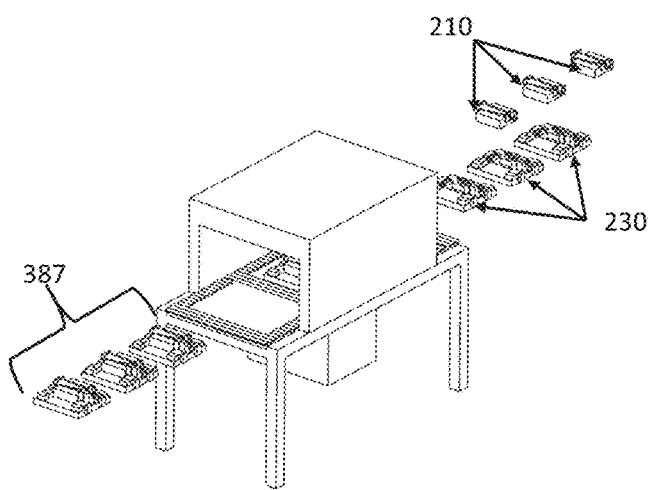
FIG. 38 is a schematic perspective view showing workpieces on workpiece holding systems going into an ultraviolet workholding adhesive curing conveyor and shuttles with workpieces being separated from the bond stations after exiting the conveyor.

FIG. 38 depicts a production system whereby unmounted workpieces are introduced into the conveyor and mounted parts exit out the opposite end where the shuttles 210 and bond stations 230 are separated. Multiple part numbers 387 may be put through the conveyor at a time supplying multiple work cells with product. With the use of an identification system utilizing vision, laser, RFID, or other means, each part number may be placed into the corresponding manufacturing cells.

FIGS. 39 and 40 provide cross sectional side and top views of the conveyor system 380, conveyor 384, curing source 382, transparent material 386 and a position sensor 388 for determining when to stop the conveyor belt.

Figure 41:
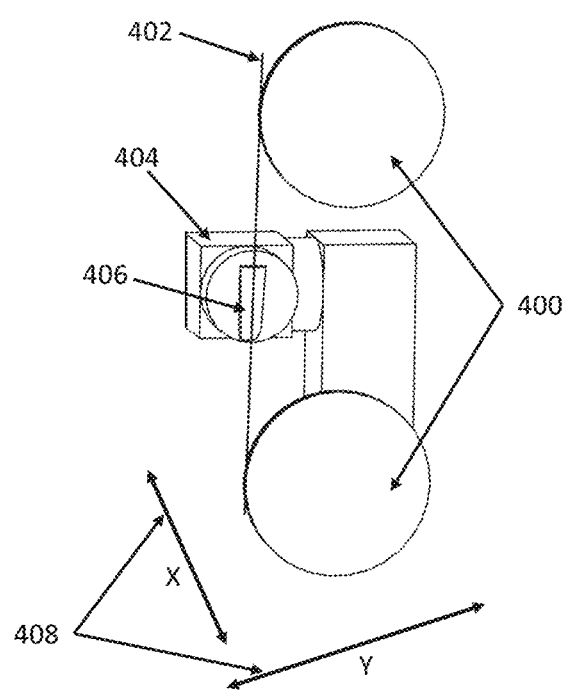
FIG. 41 is a schematic view of a system for machining a support body for use with certain embodiments of the present invention.

The conveyor may take the form of a UV curing area without a transport mechanism. Instead, a bond station is positioned in the UV curing area, the area may be enclose, and the UV illumination occurs FIG. 41 provides a schematic view of a system for machining a support body for use with certain embodiments of the present invention. This provides a method to manufacture a transparent or semi-transparent ceramic support 406 by means of an abrasive wire 402 guided by alignment wheels 400 and manipulated in 2 rotary axes 404 and 2 linear axes 408. Another embodiment is to form a transparent material into a shape by additively printing the material or forming it into a mold.

It is noted that the present invention is not limited to turbine blade elements, though it is especially useful therewith. It may also be used with other workpieces where adhesive attachment is beneficial. Any reference to a "turbine blade element" may be replaced with "workpiece" herein.

Figure 42:
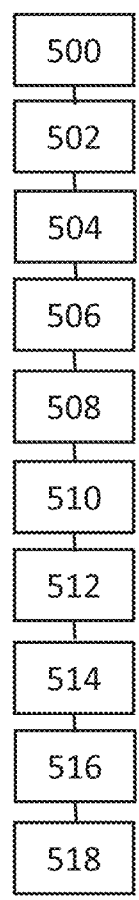
FIG. 42 is a flowchart for an exemplary set of steps according to an embodiment of the present invention.

Referring now to FIG. 42, a method in accordance with the present invention is illustrated. In one embodiment, the method is for temporarily holding a turbine blade element during one or more manufacturing processes. The turbine blade element has a central blade portion and at least one end portion. The central blade portion has a contoured blade surface. In step 500, a workholding system is provided. The workholding system includes: a support body having a contoured body surface complementary to the contoured blade surface, the complementary portion of the contoured body surface defining a bonding zone entirely formed of a transparent material; a base attached to and supporting the support body so as to form a workpiece shuttle, the base having a plurality of zero-point locating elements configured to locate the base relative to a manufacturing workstation; and a bond station configured to receive the shuttle, the bond station having a plurality of zero-point locating elements complementary to the zero-point locating elements of the base, the bond station further having a plurality of workpiece locating elements. In step 502, the shuttle is received on the bond station. In step 504, the shuttle is positioned in a predefined position by the complementary zero-point locating elements of the base and bond station. In step 506, a UV curable workholding adhesive is applied to the bonding zone between the contoured blade surface and the complementary body surface In step 508, the turbine blade element is received on the support body with the contoured blade surface adjacent the bonding zone. In step 510, the turbine blade element is positioned on the shuttle in a predetermined position relative to the zero-point locating elements of the base of the shuttle by the plurality of workpiece locating elements of the bond station. In step 512, the adhesive in the bonding zone is illuminated through the transparent material, thereby curing the adhesive such that the turbine blade element is temporarily fixed in the predetermined position relative to the zero-point locating elements of the base of the shuttle. In step 514, the shuttle, with the turbine blade element affixed thereto, is removed from the bond station and the shuttle and turbine blade element are moved to a first manufacturing workstation. In step 516, at least one manufacturing process is performed. In step 518, the turbine blade element is de-bonded from the shuttle. In some embodiments, the steps are performed in this order. In other embodiments, some steps may be performed in other orders. For example, the adhesive may be applied earlier.

What is claimed is:

1. A method for temporarily holding workpieces during one or more manufacturing processes, the workpieces each having a contoured surface, the method comprising:
    providing a workholding system having:
        a plurality of wireless UV light sources each having a battery and a UV source, each of the wireless UV light sources being selectively operable to provide UV illumination;
        a controller operable to wirelessly communicate with each of the plurality of wireless UV light sources so as to selectively trigger individual ones of the wireless UV light sources to provide the UV illumination;
        a plurality of workpiece shuttles each for temporarily holding one of the workpieces during the one or more manufacturing processes; each of the plurality of workpiece shuttles having;
            a support body having a contoured body surface complementary to the contoured surface of the workpiece, at least a portion of the contoured upper body surface formed of a transparent material and defining a bonding zone;
            the support bodying having a pocket configured for receiving one of the plurality of wireless UV light sources such that the wireless UV light source is at least partially disposed in the support body and is operable to provide the UV illumination through the transparent material to the bonding zone;

a base attached to and supporting the support body so as to form the workpiece shuttle, the base having a plurality of zero-point locating elements configured to locate the base relative to a manufacturing workstation, the base further having a support face;

a bond station configured to receive one of the plurality of workpiece shuttles, the bond station having a plurality of zero-point locating elements complementary to the zero-point locating elements of each of the bases, the bond station further having a plurality of workpiece locating elements;

receiving one of the plurality of workpiece shuttles on the bond station, wherein the support body is interconnected with the base of one of the plurality of workpiece shuttles to form the workpiece shuttle prior to the receiving step;

positioning one of the plurality of workpieces shuttles in a predefined position by the complementary zero-point locating elements of the base and bond station;

receiving one of the workpieces on the support body with contoured surface adjacent the bonding zone;

positioning the workpiece on one of the plurality of workpiece shuttles in a predetermined position relative to the zero-point locating elements of the base of the shuttle by the plurality of workpiece locating elements of the bond station;

applying a UV curable workholding adhesive to the bonding zone between the contoured surface of the workpiece and the complementary body surface;

wirelessly triggering, by the controller, the wireless UV light source that is disposed in the support body of the one of the workpiece shuttles, thereby illuminating the adhesive in the bonding zone through the transparent material with UV, and thereby curing the adhesive such that the workpiece is temporarily fixed in the predetermined position relative to the zero-point locating elements of the base of one of the plurality of workpiece shuttles;

removing one of the plurality of workpiece shuttles, with the workpiece affixed thereto, from the bond station and moving one of the plurality of workpiece shuttles and workpiece to a first manufacturing workstation;

performing at least one manufacturing process; and debonding the workpiece from the support body of one of the plurality of workpiece shuttles, wherein the debonding step comprises debonding without disassembly of the support body from the base of the shuttle.

2. The method of claim 1, wherein the support body is entirely formed of the transparent material and an entirety of the contoured upper body surface is formed of the transparent material and defines the bonding zone.

3. The method of claim 2, wherein the support body is a monolithic body of the transparent material.

4. The method of claim 1, wherein the contoured body surface of the support body is a non-flat surface.

5. The method of claim 1, wherein the contoured body surface bonding zone is an entirety of an area coextensive with the contoured surface of the workpiece.

6. The method of claim 1, wherein the debonding step comprises debonding with hot water or hot air.

7. The method of claim 1, wherein the support body comprises a component having a metal body with openings, the openings having the transparent material disposed therein.

8. The method according to claim 1, wherein the workpiece shuttle further comprises an upper portion with a second support body, the second support body having a contoured body surface complementary to an additional contoured surface of the workpiece, an additional bonding zone defined where the contoured body surface of the second support body is coextensive with the additional contoured surface of the workpiece, the method further comprising moving the upper portion of the workpiece shuttle from an open position to a closed position wherein the contoured body surface of the second support body is adjacent the additional contoured surface of the workpiece.

9. The method according to claim 8, further comprising applying the adhesive to the additional bonding zone, the illuminating step comprising illuminating the adhesive in both bonding zones.

10. The method according to claim 8, wherein:
at least a portion of the contoured body surface of the second support body is formed of a transparent material; or
the second support body is entirely formed of the transparent material.

11. The method according to claim 1, wherein the workpiece is a turbine blade element, the turbine blade element having a central blade portion and at least one end portion, the contoured surface of the workpiece comprising a contoured blade surface of the central blade portion.

* * * * *